United States Patent [19]
Fujiwara et al.

[11] Patent Number: 5,640,508
[45] Date of Patent: Jun. 17, 1997

[54] FAULT DETECTING APPARATUS FOR A MICROPROCESSOR SYSTEM

[75] Inventors: Hirokatsu Fujiwara, Hadano; Ryo Yamagata, Sagamihara, both of Japan

[73] Assignee: Hitachi, Ltd., Tokyo, Japan

[21] Appl. No.: 327,871

[22] Filed: Oct. 24, 1994

[30] Foreign Application Priority Data

Oct. 29, 1993 [JP] Japan .................. 5-294609

[51] Int. Cl.⁶ .................................. G06F 11/18
[52] U.S. Cl. .................................. 395/183.06
[58] Field of Search ............... 395/575, 183.06, 395/200, 800, 375, 650; 364/229, 229.1, 265.4, 265.6, 268.3; 371/68.1

[56] References Cited

U.S. PATENT DOCUMENTS

| | | | |
|---|---|---|---|
| 4,245,344 | 1/1981 | Richter | 371/68 |
| 4,593,396 | 6/1986 | Anderson, Jr. | 371/68 |
| 4,634,110 | 1/1987 | Julich et al. | 371/11 |
| 4,792,955 | 12/1988 | Johnson et al. | 371/68 |
| 4,967,347 | 10/1990 | Smith et al. | 364/200 |
| 5,043,990 | 8/1991 | Doi et al. | 371/68.1 |
| 5,255,367 | 10/1993 | Bruckert et al. | 395/200 |
| 5,271,023 | 12/1993 | Norman | 371/68.3 |
| 5,317,726 | 5/1994 | Horst | 395/575 |

FOREIGN PATENT DOCUMENTS

| | | | |
|---|---|---|---|
| 63-245735 | 10/1988 | Japan | G06F 15/16 |
| 63-310031 | 12/1988 | Japan | G06F 11/00 |
| 1-142833 | 6/1989 | Japan | G06F 11/18 |
| 1-145734 | 6/1989 | Japan | G06F 11/18 |

Primary Examiner—Robert W. Beausoliel, Jr.
Assistant Examiner—Stephen C. Elmore
Attorney, Agent, or Firm—Antonelli, Terry, Stout & Kraus, LLP

[57] ABSTRACT

A fault detecting apparatus includes first and second processors having an internal state generating logic unit for exclusive-ORing the operation outputs and generating an internal state signal of the first and second processors, and a state comparator unit included in the first and second processors for comparing the internal state signals of the first and second processors. When the internal state signals fail to coincide with each other, the state comparator unit decides on an error of at least one of the first and second processors.

9 Claims, 4 Drawing Sheets

FAULT DETECTING APPARATUS FOR A MICROPROCESSOR SYSTEM

BACKGROUND OF THE INVENTION

The present invention relates to fault detecting for information processing systems, or more in particular to a fault detecting apparatus for detecting an error and processing the detected error in microprocessors.

A high level of reliability is required for improved performance of a computer. In order to improve the reliability of the computer, it is necessary to detect an error accurately and to recover from the error without bringing the system down whenever an error occurs.

A method for detecting an error includes a parity check. This method, however, is not used widely as chip area increases thereby causing an increased chip cost and chip performance deterioration of the microprocessor.

A master checker scheme has been conceived as a method for detecting an error of a microprocessor. In the master checker scheme, two processors are operated synchronously and the outputs thereof are compared to detect an error, if any, thereby guaranteeing the data integrity. The use of the master checker scheme makes it possible to detect an error with the addition of comparatively small hardware.

Methods for error recovery include the automatic hardware recovery with reexecution of an instruction, the function clipping and a process succession using a multiprocessor.

SUMMARY OF THE INVENTION

An object of the present invention is to provide a fault detecting apparatus in which a data error in a given microprocessor circuit can be detected without any parity checker.

Another object of the invention is to provide a fault detecting apparatus in which an accurate interrupt in the operation of the microprocessor is made possible within a short and fixed time after the occurrence of an error.

According to one aspect of the invention, there is provided a fault detecting apparatus comprising an internal state generating logic unit for exclusive-ORing the outputs and generating an internal state signal of each of first and second processors, and a state comparator unit for comparing the internal state signals of the first and second processors, wherein when the internal state signals fail to coincide with each other, an error of at least one of the first and second processors is determined by the state comparator unit.

Further, specifically, there is provided a fault detecting apparatus comprising a plurality of conductors led from a given circuit of each of at least an arithmetic-logic unit, a control unit and a register unit making up first and second processors, an exclusive-OR unit included in each of the first and second processors for taking the exclusive-OR operation of the signals from the conductors, a comparator unit included in each of the first and second processors for comparing the output signals from the exclusive-OR units of the first and second processors and producing an error interrupt request signal when the output signals are not coincident with each other, and a stop unit for stopping the operation of at least one of processors by supplying at least the first or the second processor with the error interrupt request signal.

The stop unit is adapted to supply at least the arithmetic-logic unit, the control unit and the register unit with the error interrupt request signal to thereby stop the operation of each of the units.

Each of the first and second processors includes two data latches inserted between the arithmetic-logic unit and the register unit for storing the signal from the arithmetic-logic unit by one cycle, one data latch between the exclusive-OR unit and the comparator unit for storing the signal from the exclusive-OR unit by one cycle, and one data latch between the comparator unit and the stop unit for storing the error interrupt request signal from the comparator unit by one cycle, wherein the stop unit stops writing the signal output from the arithmetic-logic unit into the register unit three cycles later.

Further, the fault detecting apparatus may comprise an interrupt control unit for suspending the running program in response to an error interrupt request signal.

The error interrupt request signal from the comparator unit of the first processor is applied to one input of the OR circuit of the first processor on the one hand and to one input of the OR circuit of the second processor on the other hand. Also, the error interrupt request signal from the comparator unit of the second processor is applied to the other input of the OR circuit of the second processor on the one hand and to the other input of the OR circuit of the first processor on the other hand.

According to a second aspect of the invention, there is provided a fault detecting apparatus comprising a plurality of conductors led from a given circuit of each of at least the arithmetic-logic unit, the control unit and the register unit making up each of the first and second processors, an exclusive-OR unit included in the first and the second processors for exclusive-ORing the signals from the conductors, a comparator unit included in the first processor for comparing the output signal from the exclusive-OR unit of the first processor with the output signal from the exclusive-OR unit of the second processor and producing an error interrupt request signal when the two output signals fail to coincide with each other, and a stop unit for applying the error interrupt request signal to at least one of the arithmetic-logic unit, the control unit and the register unit thereby to stop the operation of each unit.

The first processor includes two delay latches inserted between the arithmetic-logic unit and the register unit, wherein the exclusive-OR unit is connected to the output side of the second delay latch, and the output side of the exclusive-OR unit is connected to one input side of the comparator unit. The second processor, on the other hand, includes two delay latches interposed between the arithmetic-logic unit and the register unit, wherein the exclusive-OR unit is connected to the output side of the arithmetic-logic unit, and the output side of the exclusive-OR unit is connected to the other input side of the comparator unit through two delay latches.

The aforementioned configuration can detect an error of an arbitrary circuit in the first and the second processors. Also, the operation of the processor can be accurately interrupted within a short time of the occurrence of an error.

DESCRIPTION OF THE PREFERRED EMBODIMENTS

Embodiments of the invention will be described with reference to the accompanying drawings.

Figure 1:
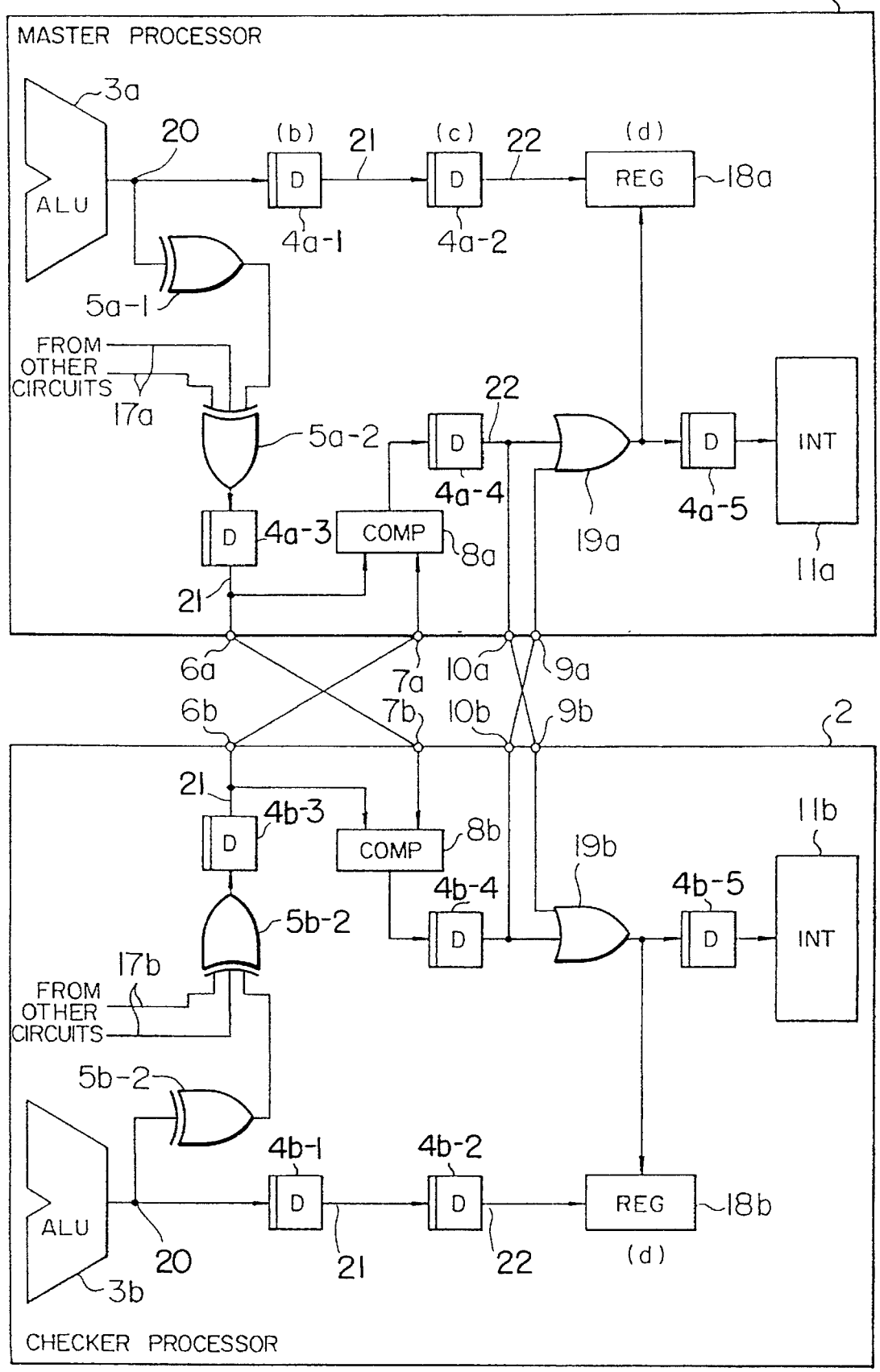
FIG. 1 is a diagram showing the circuit configuration of a fault detecting apparatus according to an embodiment of the invention.

A microprocessor system using a fault detecting apparatus according to the present invention is shown in FIG. 1. Reference numeral 1 designates a master processor, and numeral 2 indicates a checker processor. The master processor 1 and the checker processor 2 have substantially the same circuit configuration. In the substantially same circuit configuration, the suffix "a" will be attached to the component parts of the master processor 1 and the suffix "b" to those of the checker processor 2. Explanation that follows will thus be centered on the component parts of the master processor 1 while omitting the explanation of the checker processor 2 designated by the same reference numerals. The fault detecting apparatus is configured in the manner described below. Numeral 3a designates an arithmetic-logic unit of the master processor, and numeral 4a indicates a delay latch for the operation data. Numeral 5a-1 designates an exclusive-OR circuit for exclusive-ORing the data from the arithmetic-logic unit 3a. Numeral 5a-2 designates an exclusive-OR circuit for exclusive-ORing the output signal of the exclusive-OR circuit 5a-1 and the output signal produced from an arbitrary device or chip in the master processor 1 through conductors 17a. By the arbitrary device or chip is meant an arbitrary circuit including circuits making up the master processor 1 but not shown in the drawing. The conductors 17a are for supplying the output signal of an arbitrary circuit to the exclusive-OR circuit 5a-2 so that an error in the arbitrary circuit can be detected. The output signals of these arbitrary circuits may include the output signals of a register 18a or a delay latch 4a in the master processor 1 shown in FIG. 1. These output signals can be exclusive-ORed at the exclusive-OR circuit 5a-2 as far as the particular arbitrary circuit and the exclusive-OR circuit 5a-2 are connected by the conductors 17a. In this way, the exclusive-OR circuit 5a-2 produces an internal state signal as a result of the logic operation of an exclusive-OR circuit. This internal state signal can be considered simply as the result of logic operation of an exclusive-OR circuit. It is noted that the conductors 17a include all conductors for detecting errors caused in the master processor 1 as well as the conductors 17b for detecting errors caused in the checker processor 2. Numeral 6a designates an output pin for an internal state signal, and numeral 7a designates an input pin for receiving the internal state signal produced from the exclusive-OR circuit 5b-2 of the checker processor 2. Numeral 8a designates a comparator for comparing the internal state signal from the exclusive-OR circuit 5a-2 of the master processor 1 with the internal state signal from the exclusive-OR circuit 5b-2 of the checker processor 2 and, if they are not coincident with each other, producing an error interrupt request signal. Numeral 9a designates an input pin for receiving the error interrupt request signal output from the comparator 8b of the checker processor 2, and numeral 10a designates an output pin for applying the error interrupt request signal from the comparator 8a of the master processor 1 to the checker processor 2. Numeral 11a designates an interrupt control circuit for taking the logic sum of the error interrupt request signal from the comparator 8a of the master processor 1 and the error interrupt request signal from the comparator 8b of the checker processor 2 and producing an interrupt instruction in such a manner as to interrupt the running program in accordance with the error interrupt request signal. In the process, the error interrupt request signal output from the OR circuit 19a is applied to the register 18a and causes the signal write from the arithmetic-logic unit 3a to stop. An example of the error interrupt request signal representing the write stop of the register 18a was shown above. Alternatively, the error interrupt request signal may be applied to other circuit such as a display unit to stop display. The delay latches 4a, 4b are for storing the signal for one cycle.

Explanation will now be made about the operation of a microprocessor system comprising the master processor 1 and the checker processor 2 described above. The embodiment under consideration will be explained with reference to the error detection for the arithmetic-logic unit 3a of the master processor 1 and the arithmetic-logic unit 3b of the checker processor 2. The output signal (of 64 bits, for instance) of the arithmetic-logic unit 3a is applied to the exclusive-OR circuit 5a-1 where the signal is exclusive-ORed, with the output thereof applied to the exclusive-OR circuit 5a-2. The exclusive-OR circuit 5a-2 is supplied with the output of the exclusive-OR circuit 5a-1 and with the output signal of other circuits in the master processor 1, as described earlier. The exclusive-OR circuit 5a-2 of the master processor 1 outputs an internal state signal as a result of exclusive-OR operation. In similar fashion, the checker processor 2 has the exclusive-OR circuit 5b-2 output an internal state signal from the arithmetic-logic unit 3b through the exclusive-OR circuit 5b-1 like the master processor 1.

The internal state signal from the exclusive-OR circuit 5a-2 of the master processor 1 is applied to one of the inputs of the comparator 8a on the one hand and one of the inputs of the comparator 8b of the checker processor 2 through an output pin 6a on the other hand. Also, the internal state signal from the exclusive-OR circuit 5b-2 of the checker processor 2 is applied to one input of the comparator 8b on the one hand and to one input of the comparator 8a of the master processor 1 through an output pin 6b on the other hand. The comparators 8a, 8b compare the internal state signals respectively. When the internal state signals are not coincident at the comparators 8a, 8b, an error interrupt request signal is applied to one of the inputs of an OR circuit 19a through a delay latch 4a, while an error interrupt request signal from the comparator 8b is applied to the other input side of the OR circuit 19a from an output pin 10b through an input pin 9a at the same time. Further, an error interrupt request signal from the comparator 8b is applied to one of the inputs of the OR circuit 19b through a delay latch 4b, while an error interrupt request signal from the comparator 8a is supplied to the other input of the OR circuit 19b from an output pin 10a through an input pin 9b. In this manner, any occurrence of an error is reported between the master processor 1 and the checker processor 2. The error interrupt request signals from the OR circuits 19a, 19b are applied to interrupt control circuits 11a, 11b and also to corresponding registers 18a, 18b respectively. The signal write operation from the arithmetic-logic units 3a, 3b to the registers 18a, 18b is immediately stopped. Upon occurrence of an error interrupt request signal, first the write operation to the registers 18a, 18b is stopped in this way manner. On the other hand, the interrupt control circuits 11a, 11b, upon receipt of an error interrupt request signal, decides on an error interrupt condition, and interrupts the execution of the then running program. With the occurrence of an error, software control is shifted to the fault detecting program. In other words, the address of a fault detecting program is set in the program counter (not shown) to execute the fault detecting program. With the execution of the fault detecting program, the error is indicated by turning a lamp on and off, by print-out or the program in error is started a predetermined number of times. The fault detecting program may be stored in a memory in the microprocessor system or in a memory external to the microprocessor system. The error interrupt request signal, which is used for stopping the write operation to the registers 18a, 18b in the example under consideration, may alternatively be used for stopping other circuits such as a display unit.

After complete execution of the fault detecting program, an intermediate or leading address of the suspended program is set in the program counter to resume the operation of the original program.

An error detection operation similar to the above-mentioned operation is also performed through the exclusive-OR circuits 5a-2, 5b-2 for the output signals supplied from the other circuits by the conductors 17a, 17b.

In this way, as far as an arbitrary circuit in the master processor 1 and the checker processor 2 is connected to the exclusive-OR circuits 5a-2, 5b-2, an error for the particular circuit can be detected.

Figure 2:
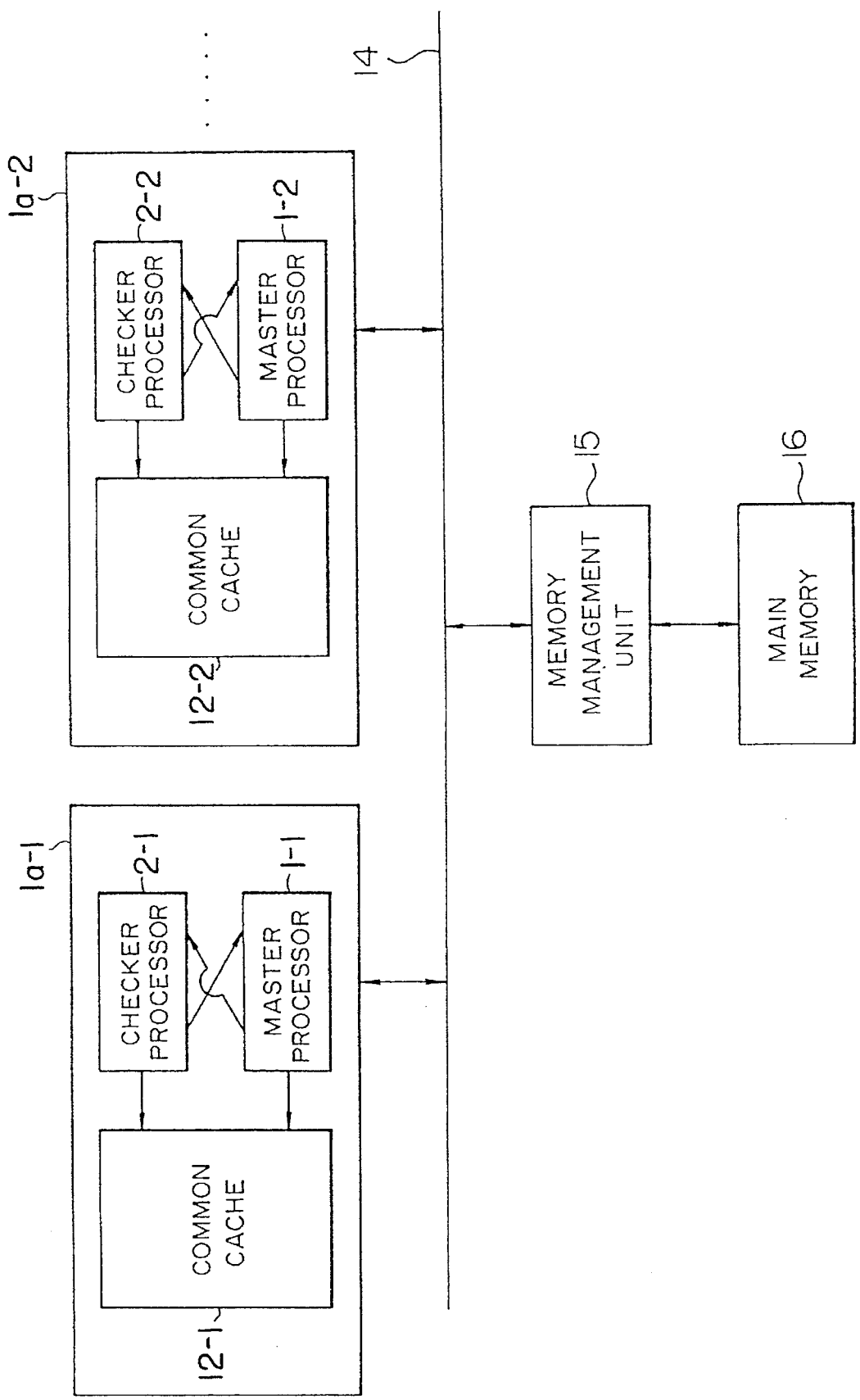
FIG. 2 is a block diagram showing an example in which microprocessors including a fault detecting apparatus according to the invention have a common cache memory.

FIG. 2 is a diagram showing a processor unit 1a including a cache memory 12 shared by the master processor 1 and the checker processor 2 having an error detection apparatus according to the invention. A plurality of processor units 1a are connected to a common bus 14. The common cache memory 12 does not directly contribute to error detection but simply is connected to the arithmetic-logic unit 3a of the master processor 1 and the arithmetic-logic unit 3b of the checker processor 2 for the purpose of data storage. The plural processor units 1a are managed by a memory management unit 15 connected to the common bus 14 to transfer data with a main memory 16.

Figure 3:
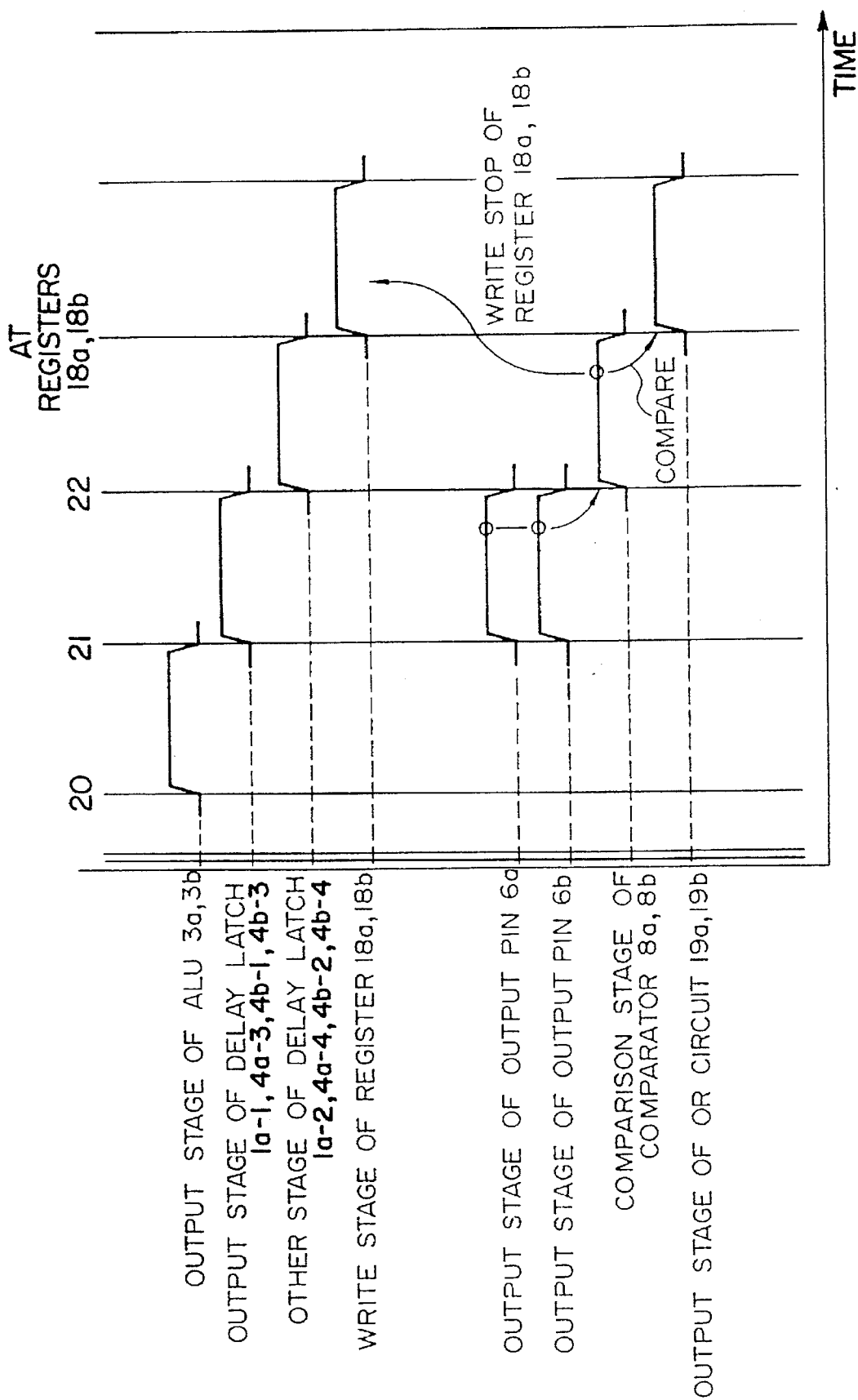
FIG. 3 is a time chart showing the operation of the fault detecting apparatus of FIG. 1.

FIG. 3 is a time chart showing the operation of a fault detecting apparatus according to the invention. First, assuming that the operation is normal. At (a), as at point (a) in FIG. 1, a signal is produced from arithmetic-logic units 3a, 3b. At (b), the delay latch 4a stores the signal for one cycle. At point (c), the signal for one cycle is stored in the delay latch 4a. The signal is written in the registers 18a, 18b at (d).

In the case where an error occurs, the internal state signals from the output pins 6a, 6b are applied to the comparators 8a, 8b through the delay latches 4a, 4b on the output side of the exclusive-OR circuits 5a-2, 5b-2 respectively. The internal state signals, upon application to the comparators 8a, 8b, are compared with each other. When the comparison at the comparators 8a, 8b is non-coincident, an error interrupt request signal is stored for one cycle at the delay latches 4a, 4b at (c). At point (d), the error interrupt request signals output from the OR circuits 19a, 19b cause the write operation of the signal to the registers 18a, 18b to stop. In this way, the write operation to the registers 18a, 18b is stopped three cycles after the occurrence of an error, while at the same time suspending the presently running program. Consequently, the write operation to the registers 18a, 18b can be stopped within a short, fixed time length from the occurrence of an error, thereby suppressing the adverse effect of an error to minimum. Although the case under consideration is for detection of an error of the output signal from the arithmetic-logic units 3a, 3b, it is obvious that an internal state signal can be generated in the same manner for the signal supplied from the conductors 17a, 17b and an error interrupt request signal can be generated thereby as described above.

Figure 4:
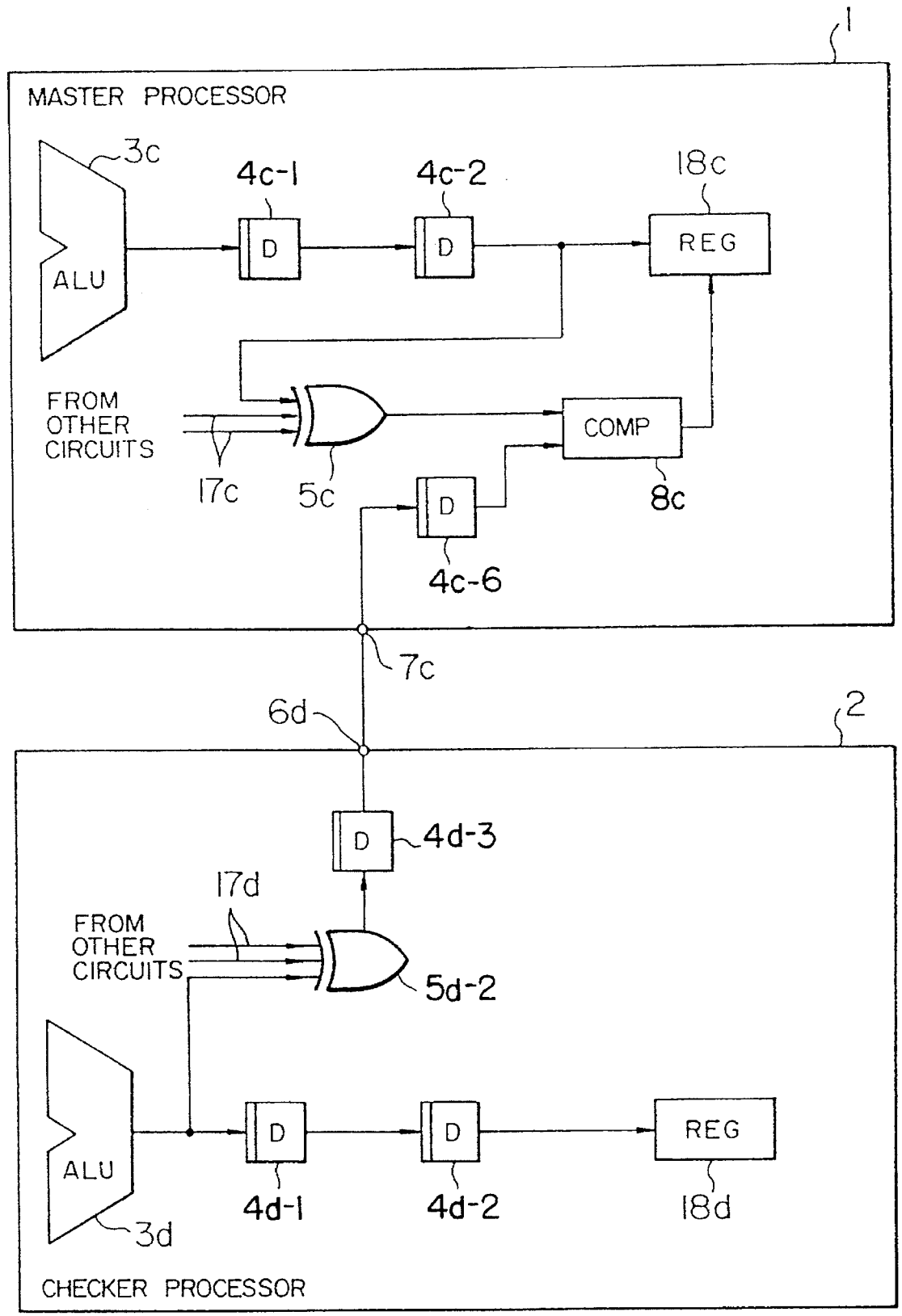
FIG. 4 is a diagram showing the circuit configuration of a fault detecting apparatus according to another embodiment of the invention.

Another example of the fault detecting apparatus is shown in FIG. 4. In this configuration, the operation of the master processor 1 and the checker processor 2 are staggered. With the master processor 1 and the checker processor 2 in this configuration, the signals written in the registers 18a, 18b are first applied to the exclusive-OR circuits 5c, 5d. The output from the exclusive-OR circuit 5c, i.e, the internal state signal is applied to the comparator 8c, the internal state signal from the exclusive-OR circuit 5d is stored for one cycle at the delay latch 4d, and the internal state signal transmitted through the output pin 6d and the input pin 7c is stored for another cycle at the delay latch 4c and applied to the comparator 8c. In the case where a non-coincidence is found at the comparator 8c, the error interrupt request signal output from the comparator 8c stops the signal write operation to the register 18c from the arithmetic-logic unit 3c. In this fashion, the rate of error detection operation of the checker processor 2 is increased by two cycles, and an allowance of two cycles is provided in transmitting the internal state signal from the exclusive-OR circuit 5d of the checker processor 2 to the comparator 8c. As a result, even when an error occurs immediately before a signal is written in the register 18c, the write operation to the register 18c can be easily stopped. In this error detection apparatus, an error which may occur to a given circuit in the master processor 1 or the checker processor 2 can be detected by applying the signal from other circuits in the master processor 1 or the checker processor 2 through the conductors 17c, 17d to the exclusive-OR circuits 5c, 5d, as far as the conductors 17c, 17d are connected to the particular given circuit in the master processor 1 or the checker processor 2.

No interrupt control circuit is not shown in the fault detecting apparatus of FIG. 4. In this example, as in the case of FIG. 1, a running program can be suspended in accordance with an error interrupt request signal by an interrupt control circuit.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A fault detecting apparatus for enabling a first processor and a second processor to perform a substantially identical processing operation in synchronism with each other and for detecting an error in accordance with a result of the operation of said first and second processors, wherein both of said first processor and said second processor comprise:

logic means for generating an internal state signal for said first and second processors by performing an exclusive ORing arithmetic operation on at least one signal received from arbitrary circuits in said first and second processors; and means for transferring the internal state signal to the other of said first and second processors, and for comparing the internal state signals in both of said first and second processors;

wherein said internal state comparator means decides on an error of at least one of said first and second processors when the respective internal state signals of said first and second processors are not coincident with each other.

2. A fault detecting apparatus for enabling a first processor and a second processor including at least arithmetic-logic means, control means and register means to perform a substantially identical processing operation to thereby detect an error of the processing operation of both of said first and second processors, comprising:

a plurality of conductors led from all circuits examined of at least the arithmetic-logic means, the control means and the register means making up said first and second processors;

exclusive-OR means included in said first and second processors for performing an exclusive-ORing operation on signals from said plurality of the conductors, and for transferring an output signal to the other of said first and second processors;

comparator means included in said first and second processors for comparing the output signal in both of said first and second processors, transferring an output signal from said comparator means to the other of said first and second processors, and for producing an error interrupt request signal when the respective output signals of said first and second processors fail to coincide with each other; and means for stopping operation of at least one of said first and second processors by applying the error interrupt request signal to at least one of said first and second processors.

3. A fault detecting apparatus according to claim 2, wherein said stop means stops operation of each of said arithmetic-logic means, control means and register means by applying the error interrupt request signal to at least said arithmetic-logic means, said control means and said register means.

4. A fault detecting apparatus according to claim 2, wherein both of said first processor and said second processor further comprises two data latches inserted between said arithmetic-logic means and said register means for storing a signal from said arithmetic-logic means for one cycle, one data latch inserted between said exclusive-OR means and the comparator means for storing the signal from said exclusive-OR means for one cycle, and one data latch inserted between said comparator means and said stop means for storing the error interrupt request signal from the comparator means for one cycle, whereby a write operation of the signal produced from said arithmetic-logic means into said register means is stopped three cycles later by the stop means.

5. A fault detecting apparatus according to claim 2, further comprising interrupt control means for suspending a running program in response to the error interrupt request signal.

6. A fault detecting apparatus according to claim 2, wherein the error interrupt request signal from said comparator means of said first processor is applied to one input side of an OR circuit of said first processor and to one input side of the OR circuit of said second processor, the error interrupt request signal being applied from said comparator means of said second processor to another input side of the OR circuit of said second processor and to the other input side of the OR circuit of said first processor, and wherein one of the error interrupt request signals from the OR circuits is supplied to one of said register means to suspend operation of the register means.

7. A fault detecting apparatus for enabling a substantially identical processing operation to be performed by a first processor and a second processor, both including at least arithmetic-logic means, control means and register means thereby to detect an error of the processing operation of said first and second processors, comprising:

a plurality of conductors led from all circuits to be examined of at least said arithmetic-logic means, said control means and said register means making up said first and second processors;

exclusive-OR means included in said first and second processors for performing an exclusive-ORing operation on signals from the plurality of conductors, and for transferring an output signal to the other of said first and second processors;

comparator means included in said first processor for comparing the output signal from the exclusive-OR means of the first processor with the output signal from said exclusive-OR means of said second processor, transferring an output signal from said comparator means to the other of said first and second processors, and producing an error interrupt request signal when the output signals fail to coincide with each other; and stop means for applying an error interrupt request signal to at least a selected one of said arithmetic-logic means, said control means and the register means thereby to stop operation of at least the exclusive-OR means, said comparator means and said stop means.

8. A fault detecting apparatus according to claim 7, wherein said first processor includes two delay latches inserted between said arithmetic-logic means and said register means, said exclusive-OR means is connected to an output side of one of the delay latches, and an output side of said exclusive-OR means is connected to one of the input sides of said comparator means; and said second processor further includes two delay latches inserted between said arithmetic-logic means and said register means, said exclusive-OR means being connected to an output side of said arithmetic-logic means, the output side of said exclusive-OR means being connected to the other of input sides of said comparator means through the two delay latches.

9. A fault detecting apparatus according to claim 7, further comprising interrupt control means for suspending a running program in response to an error interrupt request signal.

* * * * *